(12) United States Patent
Mochiku (10) Patent No.: US 8,488,094 B2
(45) Date of Patent: Jul. 16, 2013

(54) ELECTRO-OPTICAL DEVICE SUBSTRATE, ELECTRO-OPTICAL DEVICE, AND ELECTRONIC APPARATUS

(75) Inventor: Hiroshi Mochiku, Sapposo (JP)

(73) Assignee: Seiko Epson Corporation, Tokyo (JP)

( * ) Notice: Subject to any disclaimer, the term of this patent is extended or adjusted under 35 U.S.C. 154(b) by 298 days.

(21) Appl. No.: 13/004,252

(22) Filed: Jan. 11, 2011

(65) Prior Publication Data

US 2011/0176099 A1    Jul. 21, 2011

(30) Foreign Application Priority Data

Jan. 15, 2010   (JP) .................................. 2010-006993

(51) Int. Cl.
  *G02F 1/1345* (2006.01)
  *G02F 1/1343* (2006.01)
(52) U.S. Cl.
  USPC .......................................... 349/149; 349/152
(58) Field of Classification Search
  USPC .......................................... 349/139, 149, 152
  See application file for complete search history.

(56) References Cited

U.S. PATENT DOCUMENTS 7,019,809 B2    3/2006   Sekiguchi

FOREIGN PATENT DOCUMENTS

JP    2008134670    6/2008

*Primary Examiner* — Uyen Chau N Le
*Assistant Examiner* — Michael Mooney
(74) *Attorney, Agent, or Firm* — Lowe Hauptman Ham & Berner, LLP (57) ABSTRACT

An electro-optical device substrate includes, upon a substrate: multiple pixel units; multiple first electrodes, provided in a peripheral region located in the periphery of a pixel region in which the multiple pixel units are arranged, that are configured containing a first conductive material; multiple second electrodes, provided in the peripheral region, that are configured containing a second conductive material that differs from the first conductive material; multiple first lines that are formed in the peripheral region, are configured containing the first conductive material, and that electrically connect first electrodes that are adjacent to each other of the multiple first electrodes; and a second line that is formed in the peripheral region and that electrically connects at least one of the multiple first electrodes and at least one of the multiple second electrodes. The electrical resistance of the second line is higher than the electrical resistance of the multiple first lines.

11 Claims, 5 Drawing Sheets

ELECTRO-OPTICAL DEVICE SUBSTRATE, ELECTRO-OPTICAL DEVICE, AND ELECTRONIC APPARATUS

BACKGROUND

1. Technical Field

The present invention relates to the technical field of electro-optical device substrates used in electro-optical devices such as, for example, liquid crystal display devices and the like, electro-optical devices that include such electro-optical device substrates, and electronic apparatuses such as, for example, liquid crystal projectors and the like that include such electro-optical devices.

2. Related Art

Employing this type of electro-optical device, it is necessary to prevent the galvanic corrosion of electrodes. For example, JP-A-2008-134670 discloses a liquid crystal panel, serving as an example of an electro-optical device according to the invention, in which a liquid crystal layer is sealed between a first substrate and a second substrate using a sealant; in this liquid crystal panel, a thin-film insulating layer is provided on lead electrodes for applying electric signals to electrodes that form pixel portions so as to cover the portions of the lead electrodes that are disposed outside of a sealant member.

However, the primary focus of JP-A-2008-134670 is preventing the galvanic corrosion of the lead electrodes caused by moisture when the liquid crystal panel that has already been manufactured is actually being used. Accordingly, the technique disclosed in JP-A-2008-134670 has a technical problem in that it is extremely difficult to suppress the galvanic corrosion of electrodes that occurs during the process for manufacturing the electro-optical device.

SUMMARY

An advantage of some aspects of the invention is to provide an electro-optical device substrate, an electro-optical device, and an electronic apparatus that are capable of suppressing the occurrence of galvanic corrosion of electrodes during the manufacturing process of an electro-optical device.

In order to solve the aforementioned problem, an electro-optical device substrate according to an aspect of the invention includes, upon a substrate: multiple pixel units; multiple first electrodes, provided in a peripheral region located in the periphery of a pixel region in which the multiple pixel units are arranged, that are configured containing a first conductive material; multiple second electrodes, provided in the peripheral region, that are configured containing a second conductive material that differs from the first conductive material; multiple first lines that are formed in the peripheral region, are configured containing the first conductive material, and electrically connect first electrodes that are adjacent to each other of the multiple first electrodes; and a second line that is formed in the peripheral region and that electrically connects at least one of the multiple first electrodes and at least one of the multiple second electrodes. Here, the electrical resistance of the second line is higher than the electrical resistance of the multiple first lines.

According to the electro-optical device substrate of the invention, the multiple pixel units are arranged in, for example, matrix form upon a substrate that is, for example, a silica substrate. The multiple first electrodes, multiple second electrodes, multiple first lines, and a second line are provided in the peripheral region that is located in the periphery of the pixel region in which the multiple pixel units are arranged upon the substrate.

The multiple first electrodes contain the first conductive material, which is, for example, aluminum or the like. On the other hand, the multiple second electrodes contain the second conductive material, which is different from the first conductive material, and is, for example, ITO (Indium Tin Oxide).

Each of the multiple first lines contains the first conductive material, whereas of the multiple first electrodes, the first electrodes that are adjacent are electrically connected to each other. The second line is electrically connected between at least one of the multiple first electrodes and at least one of the multiple second electrodes.

In particular, in the invention, the second line is configured so that the electrical resistance thereof is higher than the electrical resistance of the multiple first lines. Here, the following can be given as examples of methods for increasing the electrical resistance of the second line beyond the electrical resistance of the first lines: (i) reducing the width of the second line to less than the width of the first lines; (ii) increasing the length of the second line to longer than the length of the first lines; and (iii) configuring the second line of a conductive material that has a higher electrical resistivity than the electrical resistivity of a first metal of which the first lines are configured.

The following has been discovered through research carried out by the inventors of this invention. During the manufacturing process, assuming that the two types of electrodes configured of mutually different conductive materials are electrically connected to each other and the two types of electrodes are exposed on the surface of the substrate, if, for example, a cleansing liquid for cleaning the substrate is applied to the substrate, there is a risk that galvanic corrosion will occur due to differences in the ionization tendencies between the conductive materials of which the two types of electrodes are respectively configured. Accordingly, there is a risk that the yield of the electro-optical device substrate will drop, which in turn will lead to a drop in the reliability of an electro-optical device that includes the electro-optical device substrate.

However, in the invention, as described above, the second line is configured so that the electrical resistance thereof is higher than the electrical resistance of the multiple first lines. For this reason, if, during the manufacturing process, a cleansing liquid is applied to the substrate when the first electrode and the second electrode are electrically connected to each other and the first electrode and the second electrode are exposed on the surface of the substrate, the movement of charges between the first electrode and the second electrode is suppressed, thus making it possible to suppress the occurrence of the galvanic corrosion phenomenon.

Therefore, according to the electro-optical device substrate of the invention, the occurrence of galvanic corrosion of the electrodes during the manufacturing process can be suppressed. It is also possible to suppress a drop in the yield of the electro-optical device substrate and a drop in the reliability of an electro-optical device that includes the electro-optical device substrate.

In an electro-optical device substrate according to another aspect of the invention, the substrate has a layered structure containing multiple conductive layers; the multiple first electrodes, the multiple second electrodes, and the multiple first lines configure at least part of one of the multiple conductive layers; and the second line configures at least part of another of the multiple conductive layers.

According to this aspect, the substrate has a layered structure containing multiple conductive layers, and thus higher performance and smaller sizes can be achieved for the electro-optical device substrate, which is extremely advantageous in terms of practical applicability.

In an electro-optical device substrate according to another aspect of the invention, when the substrate is viewed from above, the width of the second line is narrower than the width of the multiple first lines.

According to this aspect, it is comparatively easy to increase the electrical resistance of the second line beyond the electrical resistance of the first lines, which is extremely advantageous in terms of practical applicability.

In an electro-optical device substrate according to another aspect of the invention, the length of the second line is longer than the distance between adjacent second electrodes of the multiple second electrodes.

According to this aspect, it is comparatively easy to increase the electrical resistance of the second line beyond the electrical resistance of the first lines, which is extremely advantageous in terms of practical applicability.

In an electro-optical device substrate according to another aspect of the invention, the second line is configured containing a conductive material having a higher electrical resistivity than the electrical resistivity of the first conductive material.

According to this aspect, it is comparatively easy to increase the electrical resistance of the second line beyond the electrical resistance of the first lines, which is extremely advantageous in terms of practical applicability.

In order to solve the aforementioned problem, an electro-optical device according to another aspect of the invention includes the aforementioned electro-optical device substrate according to the invention (including the various aspects thereof).

The electro-optical device according to the invention includes the aforementioned electro-optical device substrate, and thus the occurrence of galvanic corrosion of the electrodes during the manufacturing process can be suppressed. Accordingly, it is possible to provide a highly-reliable electro-optical device.

In order to solve the aforementioned problem, an electronic apparatus according to the invention includes the aforementioned electro-optical device according to the invention.

The electronic apparatus of the invention includes the aforementioned electro-optical device, and thus the occurrence of galvanic corrosion of the electrodes during the manufacturing process can be suppressed. Accordingly, various types of electronic apparatuses, such as projection-type display apparatuses, mobile telephones, PDAs, word processors, video recorders having viewfinders or monitor displays, workstations, videophones, POS terminals, touch panels, and so on that can display high-quality images can be realized.

These and other effects and advantages of the invention will be made clear from the embodiments described hereinafter.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of an electro-optical device substrate, an electro-optical device, and an electronic apparatus according to the invention will be described based on the drawings. Note that in the appended drawings, the scales of the various layers and members are illustrated as being different from the actual scales in order to enable those layers and members to be visible in the drawings.

Electro-Optical Device

An embodiment of an electro-optical device according to the invention will be described with reference to FIGS. 1 through 5. In this embodiment, an active-matrix driven liquid crystal device having an internal driving circuit will be described as an example of an electro-optical device.

Figure 1:
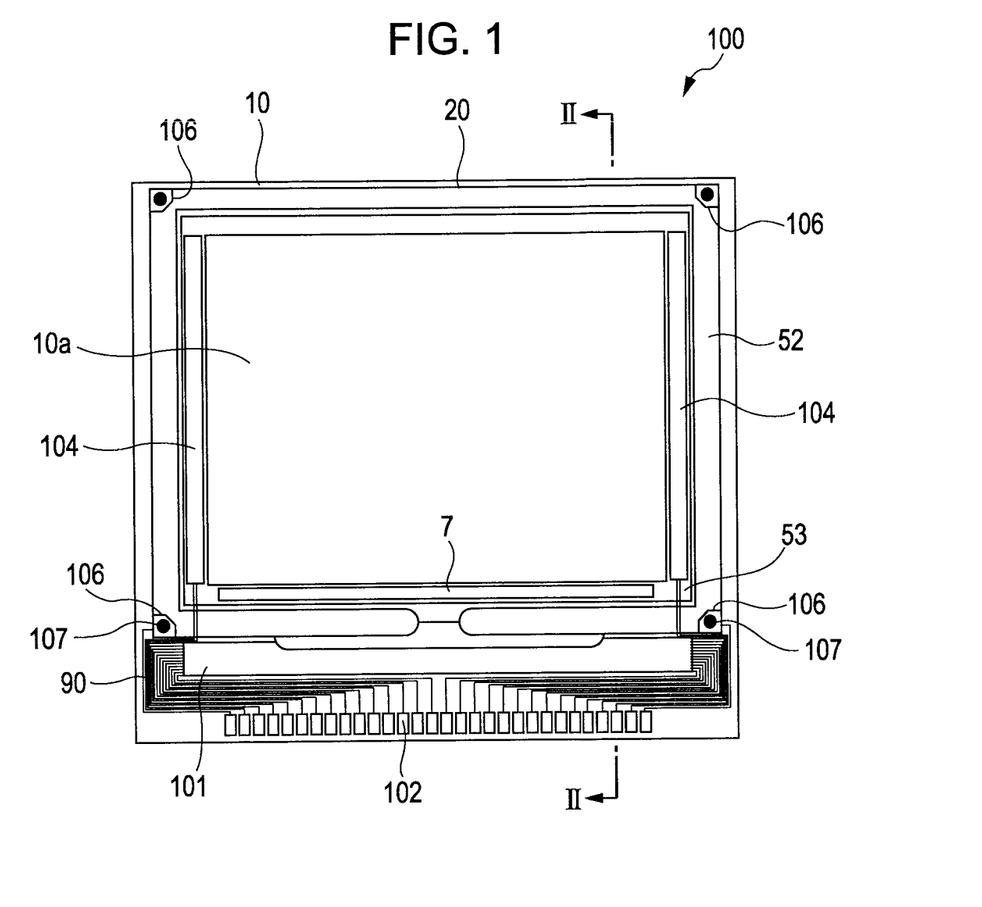
FIG. 1 is a plan view illustrating a liquid crystal device according to an embodiment of the invention seen from the side of an opposing substrate along with various constituent elements formed upon a TFT array substrate.

First, the overall configuration of the liquid crystal device according to this embodiment will be described with reference to FIGS. 1 and 2. FIG. 1 is a plan view illustrating a liquid crystal device according to this embodiment of the invention seen from the side of an opposing substrate along with various constituent elements formed upon a TFT (Thin-Film Transistor) array substrate, and FIG. 2 is a cross-section viewed along the II-II line shown in FIG. 1.

Figure 2:
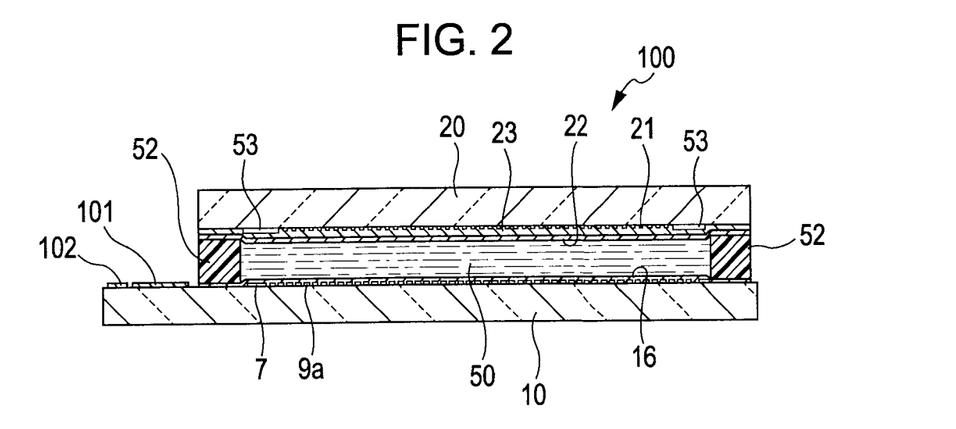
FIG. 2 is a cross-section viewed along the II-II line shown in FIG. 1.

As shown in FIGS. 1 and 2, in a liquid crystal device 100 according to this embodiment, a TFT array substrate 10 and an opposing substrate 20 are disposed so as to oppose each other. The TFT array substrate 10 is a substrate configured of, for example, a silica substrate, a glass substrate, a silicon substrate, or the like, whereas the opposing substrate 20 is a substrate that is configured of, for example, a silica substrate, a glass substrate, or the like. A liquid crystal layer 50 is confined between the TFT array substrate 10 and the opposing substrate 20, and the TFT array substrate 10 and opposing substrate 20 are fixed to each other by a sealant 52 provided in a seal region located around the outside of an image display region 10a.

The sealant 52 is configured of, for example, an ultraviolet curable resin, thermosetting resin, or the like, or a dual ultraviolet curable/thermosetting resin for laminating the substrates to each other, and in the manufacturing process, is cured through ultraviolet light irradiation, the application of heat, or the like after being applied to the TFT array substrate 10. Spacers such as glass fibers, glass beads, or the like are distributed throughout the sealant 52 in order to ensure that the space between the TFT array substrate 10 and the opposing substrate 20 (in other words, a gap) is a predetermined value. Note that the spacers may be disposed in the image display region 10a or a peripheral region located in the periphery of the image display region 10a in addition to or in place of materials mixed with the sealant 52.

In FIG. 1, a light-blocking film border 53, which has light-blocking properties and defines the image display region 10a, is provided on the opposing substrate 20, parallel to the inner side of the seal region in which the sealant 52 is disposed. However, some or all of this light-blocking film border 53 may be provided on the TFT array substrate 10 as an internal light-blocking film.

A data line driving circuit 101 and an external circuit connection terminal 102 are provided along one side of the TFT array substrate 10, in the region that is located on the outside of the seal region in which the sealant 52 is disposed, and that is within the peripheral region. A sampling circuit 7 is provided along that same side, further inward than the seal region, and is provided so as to be covered by the light-blocking film border 53. Scanning line driving circuits 104 are provided in the border regions on the inside of the seal region along the two sides that are adjacent to the aforementioned side, and are provided so as to be covered by the light-blocking film border 53.

Upper and lower conductive terminals 106 for connecting the two substrates through upper and lower conductive materials 107 are disposed in the four corners of the TFT array substrate 10 in locations that oppose the opposing substrate 20. Accordingly, electrical conductivity is achieved between the TFT array substrate 10 and the opposing substrate 20. Furthermore, distributing wiring 90 for electrically connecting the external circuit connection terminal 102, the data line driving circuit 101, the scanning line driving circuits 104, the upper and lower conductive terminals 106, and so on are formed as well.

As shown in FIG. 2, a layered structure in which pixel switching transistors serving as driving elements and lines such as scanning lines and data lines are embedded is formed upon the TFT array substrate 10. Although the detailed configuration of this layered structure has been omitted from FIG. 2, pixel electrodes 9a configured of a transparent material such as ITO are formed upon the layered structure in island form, in a predetermined pattern for each pixel.

The pixel electrodes 9a are formed upon the TFT array substrate 10 in the image display region 10a so as to oppose opposing electrodes 21, which will be discussed later. An orientation layer 16 is formed upon the surface of the TFT array substrate 10 that faces the liquid crystal layer 50, or in other words, upon the pixel electrodes 9a, so as to cover the pixel electrodes 9a.

A light-blocking film 23 is formed on the surface of the opposing substrate 20 that opposes the TFT array substrate 10. The light-blocking film 23 is formed in a grid shape when viewed, for example, from above the opposing surface in the opposing substrate 20. Closed regions are defined in the opposing substrate 20 by the light-blocking film 23, and thus the regions divided up by the light-blocking film 23 serve as open regions that allow light emitted by, for example, the lamp of a projector or a backlight for direct view to pass through. Note that the light-blocking film 23 may be formed in a striped shape, and the closed regions may be defined by the light-blocking film 23 and the various constituent elements such as the data lines provided in the TFT array substrate 10.

The opposing electrodes 21, configured of a transparent material such as ITO, are formed upon the light-blocking film 23 so as to oppose the multiple pixel electrodes 9a. A color filter, which is not shown in FIG. 2, may be formed upon the light-blocking film 23 in regions that include the open regions and part of the closed regions, in order to implement color displays in the image display region 10a. An orientation layer 22 is formed on the opposing electrodes 21 on the opposing surface of the opposing substrate 20.

Note that in addition to the data line driving circuit 101, the scanning line driving circuits 104, the sampling circuit 7, and so on, a precharging circuit for supplying precharge signals of a predetermined voltage level to each of the multiple data lines prior to image signals, an examination circuit for testing the quality of and discovering defects in the liquid crystal device during manufacture and after shipping, and so on may be formed upon the TFT array substrate 10 illustrated in FIGS. 1 and 2.

Figure 3:
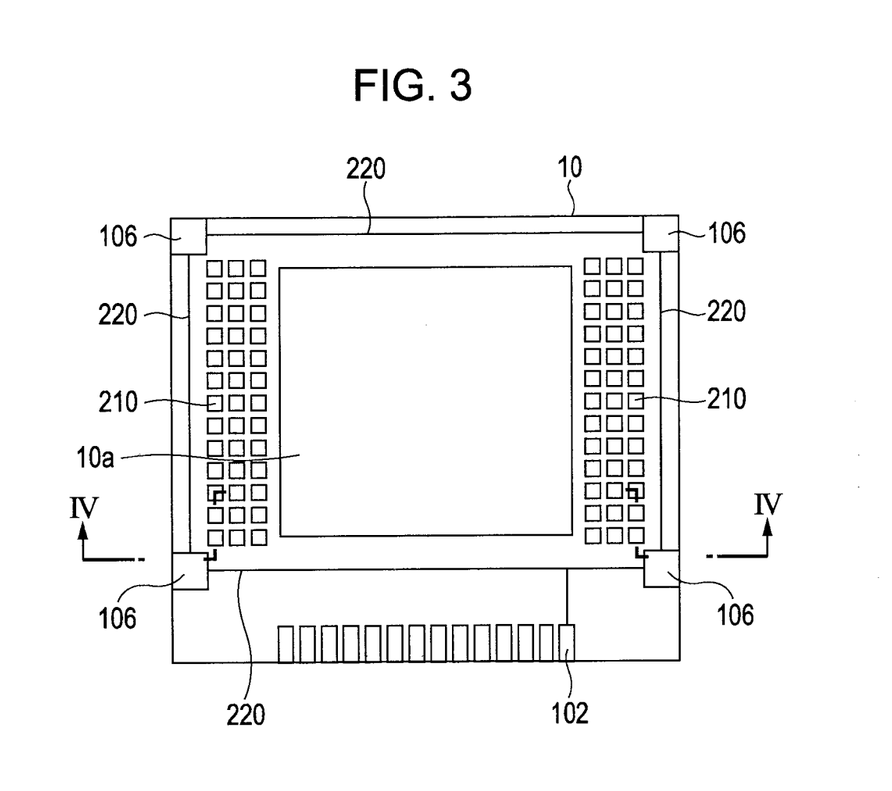
FIG. 3 is a plan view illustrating a TFT array substrate according to an embodiment of the invention seen from above.
Figure 4:
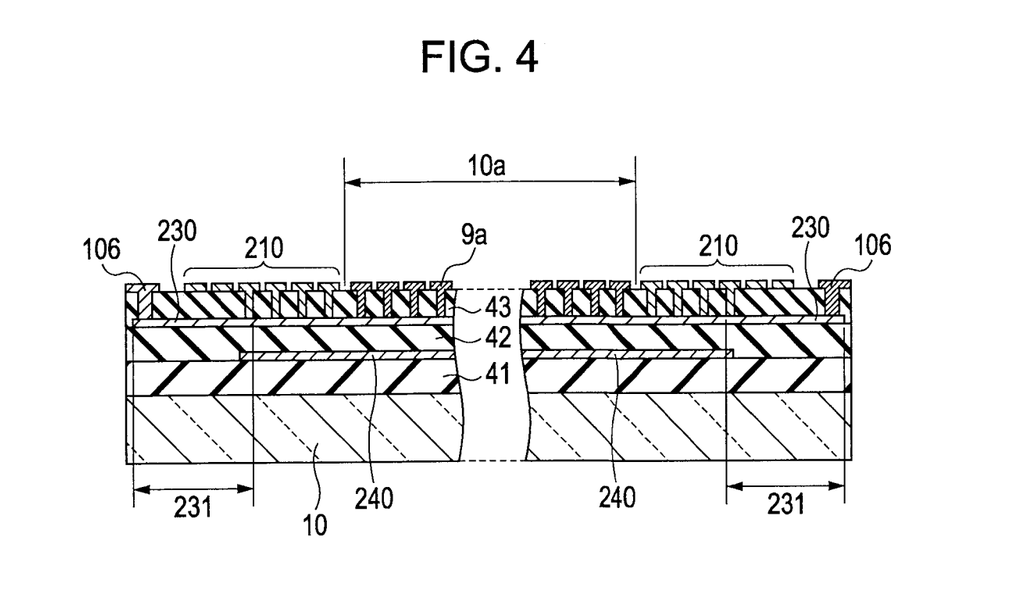
FIG. 4 is a cross-section viewed along the IV-IV line shown in FIG. 3.

Next, the TFT array substrate according to this embodiment will be further described with reference to FIGS. 3 and 4. FIG. 3 is a plan view illustrating the TFT array substrate according to this embodiment seen from above, and FIG. 4 is a cross-section viewed along the IV-IV line shown in FIG. 3. Note that in FIGS. 3 and 4, to facilitate the descriptions, only the members of direct relation are illustrated, whereas the other members have been omitted from the drawings.

As shown in FIG. 3, the multiple upper and lower conductive terminals 106 configured so as to contain, for example, an aluminum and copper alloy (called "Al/Cu" hereinafter for simplicity's sake), potential lines 220 that electrically connect the multiple upper and lower conductive terminals 106 that are adjacent to each other, and multiple inhibiting patterns 210 configured so as to contain, for example, ITO, are formed on the TFT array substrate 10 in the peripheral region located in the periphery of the image display region 10a. The multiple inhibiting patterns 210 are formed in a region that is on the inside of the multiple upper and lower conductive terminals 106 and the potential lines 220, and that is on the outside of the image display region 10a.

Note that the potential line 220 is electrically connected to a terminal, among the external circuit connection terminals 102, that supplies, for example, a common electrode potential (for example, 7 V).

As shown in FIG. 4, a potential line 230 is formed on a lower layer of the upper and lower conductive terminals 106 or the like under an inter-layer insulating film 43. The upper and lower conductive terminals 106 and at least some of the inhibiting patterns 210 are electrically connected by this potential line 230. Note that as shown in FIG. 4, the length of a potential line connection portion 231, which configures part of the potential line 230 and is electrically connected between the upper and lower conductive terminals 106 and the inhibiting patterns 210, is set so as to be longer than the distance between adjacent inhibiting patterns 210.

A potential line 240 is formed on a lower layer of the potential line 230 under an inter-layer insulating film 42. The potential line 240 is electrically connected to a terminal, among the external circuit connection terminals 102, that supplies, for example, a high potential (for example, 15 V).

Scanning lines and the like (not shown) are formed on a lower layer of the potential line 240 under an inter-layer insulating film 41. The inter-layer insulating films 41, 42, and 43 prevent the various constituent elements from short-circuiting.

In this embodiment, the potential line connection portions 231 that configure part of the potential line 230 in particular are configured so that the electrical resistance thereof is greater than the electrical resistance of the potential lines 220. To be more specific, as shown in FIG. 5, when viewing the TFT array substrate 10 from above, the potential line connection portions 231 are configured so that the widths thereof are narrower than the widths of the potential lines 220, and thus the configuration is such that the electrical resistance of the potential line connection portions 231 is greater than the electrical resistance of the potential lines 220.

Figure 5:
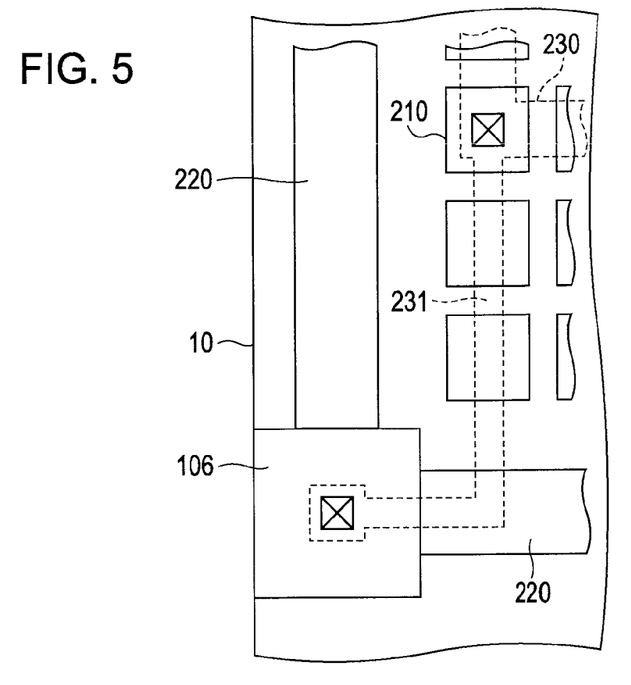
FIG. 5 is an enlarged plan view illustrating part of a TFT array substrate according to an embodiment of the invention in an enlarged manner.

Note that FIG. 5 is an enlarged plan view illustrating part of a TFT array substrate according to this embodiment in an enlarged manner.

The following has been discovered through research carried out by the inventors of this invention. When the liquid crystal device 100 is being driven, the potential of the potential line 240 is, for example, 15 V, and the potential of the opposing electrodes 21 (see FIG. 2) is, for example, 7 V, and thus if the inhibiting patterns 210 have not been formed, there is the possibility that the arrays of liquid crystal molecules will become fixed (so-called "burn-in") due to the occurrence of an electrical field between the potential line 240 and the opposing electrodes 21. However, by forming the inhibiting patterns 210 on the upper layer side of the potential line 240 and setting the potential of the inhibiting patterns 210 to the same potential as the opposing electrodes 21, the occurrence of burn-in can be suppressed.

In order to set the potential of the inhibiting patterns 210 to the same potential as the opposing electrodes 21, the inhibiting patterns 210 and the upper and lower conductive terminals 106 are electrically connected to each other during the process of manufacturing the liquid crystal device 100. Here, assuming that the inhibiting patterns 210 that are configured so as to contain, for example, ITO, and the upper and lower conductive terminals 106 that are configured so as to contain, for example, Al/Cu are electrically connected to each other, and that the inhibiting patterns 210 and upper and lower conductive terminals 106 are exposed on the surface of the substrate, if, for example, a cleansing liquid for cleaning the substrate is applied to the substrate, there is the possibility, in this embodiment, that galvanic corrosion will occur primarily in the inhibiting patterns 210 that are formed of ITO, which has a high tendency to ionize, due to differences in the ionization tendencies between the conductive materials of which the inhibiting patterns 210 and the upper and lower conductive terminals 106 are configured.

However, as mentioned earlier, in this embodiment, the configuration is such that the electrical resistance of the potential line connection portion 231 is greater than the electrical resistance of the potential lines 220. For this reason, if, during the process of manufacturing the liquid crystal device 100, a cleansing liquid is applied to the substrate when the inhibiting patterns 210 and the upper and lower conductive terminals 106 are electrically connected to each other and the inhibiting patterns 210 and upper and lower conductive terminals 106 are exposed on the surface of the substrate, the movement of charges between the inhibiting patterns 210 and the upper and lower conductive terminals 106 is suppressed, thus making it possible to suppress the occurrence of the galvanic corrosion phenomenon.

Note that as shown in FIG. 5, the electrical resistance of the potential line connection portion 231 may be increased beyond the electrical resistance of the potential lines 220 by configuring the potential line connection portion 231 of a conductive material having an electrical resistivity that is higher than the electrical resistivity of, for example, the Al/Cu of which the potential lines 220 are configured, instead of or in addition to increasing the electrical resistance of the potential line connection portion 231 beyond the electrical resistance of the potential lines 220 by setting the width of the potential line connection portion 231 to be less than the width of the potential lines 220. Furthermore, the electrical resistance of the potential line connection portion 231 may be increased by setting the width of the potential line connection portion 231 to be the same as that of the potential line 230 and providing an opening at the middle of the potential line 230 in the width direction thereof. Meanwhile, it is not necessary to increase the electrical resistance of the other areas of the potential line 230 aside from the potential line connection portion 231, or in other words, of the portions that electrically connect the inhibiting patterns 210 to each other. Through this, it is possible to make the potentials between two inhibiting patterns 210 nearly uniform, which makes it possible to suppress unevenness in the orientation states of the liquid crystals even in the peripheral region outside of the image display region 10a.

Furthermore, in this embodiment, it is not necessary to electrically connect all of the inhibiting patterns 210 with the potential line 230; as shown in FIG. 4, for example, the inhibiting patterns 210 disposed in locations that are close to the upper and lower conductive terminals 106 are not electrically connected. This, too, makes it possible to increase the electrical resistance by securing distance between the upper and lower conductive terminals 106 and the inhibiting patterns 210 that are electrically connected. It is thus possible to eliminate a step between the image display region 10a and the peripheral region even with inhibiting patterns 210 that are not conductively connected, thus making it easy to flatten the insulating films and so on formed in the top layers.

Note that the TFT array substrate 10, the image display region 10a, the upper and lower conductive terminals 106, the inhibiting patterns 210, the potential lines 220, the potential line connection portion 231, AL/Cu, and ITO according to this embodiment are examples of a substrate, a pixel region, a first electrode, a second electrode, first lines, a second line, a first conductive material, and a second conductive material according to the invention, respectively. Furthermore, the portions shown in FIG. 4 from the TFT array substrate 10 to the upper and lower conductive terminals 106, the inhibiting patterns 210, and so on configure an example of an electro-optical device substrate according to the invention.

First Variation

Figure 6:
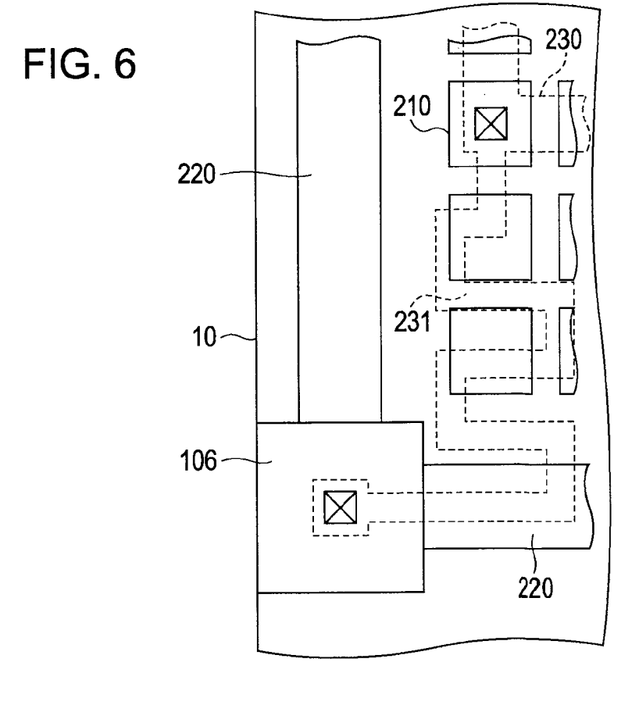
FIG. 6 is an enlarged plan view illustrating part of a TFT array substrate according to a first variation on an embodiment of the invention in an enlarged manner.

Next, a first variation on the liquid crystal device according to this embodiment will be described with reference to FIG. 6. FIG. 6 is an enlarged plan view illustrating part of a TFT array substrate according to the first variation on this embodiment in an enlarged manner.

As shown in FIG. 6, in this variation, the potential line connection portion 231 is formed so as to meander when the TFT array substrate 10 is viewed from above. This makes it possible to increase the electrical resistance of the potential line connection portion 231 beyond the electrical resistance of the potential lines 220. As a result, the occurrence of the galvanic corrosion phenomenon in the process of manufacturing the liquid crystal device 100 can be suppressed.

Second Variation

Figure 7:
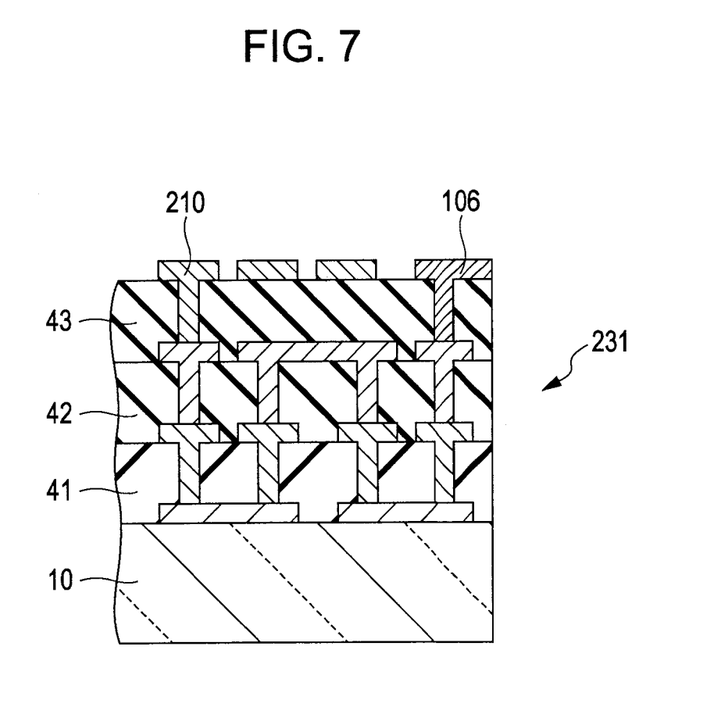
FIG. 7 is an enlarged cross-section view illustrating part of a TFT array substrate according to a second variation on an embodiment of the invention in an enlarged manner.

Next, a second variation on the liquid crystal device according to this embodiment will be described with reference to FIG. 7. FIG. 7 is an enlarged cross-section view illustrating part of a TFT array substrate according to the second variation on this embodiment in an enlarged manner.

As shown in FIG. 7, in this variation, the potential line connection portion 231 is configured by multiple conductive patterns formed in respective multiple conductive layers being electrically connected to each other via contact holes. This makes it possible to increase the electrical resistance of the potential line connection portion 231 beyond the electrical resistance of the potential lines 220. As a result, the occurrence of the galvanic corrosion phenomenon in the process of manufacturing the liquid crystal device 100 can be suppressed.

Electronic Apparatus

Figure 8:
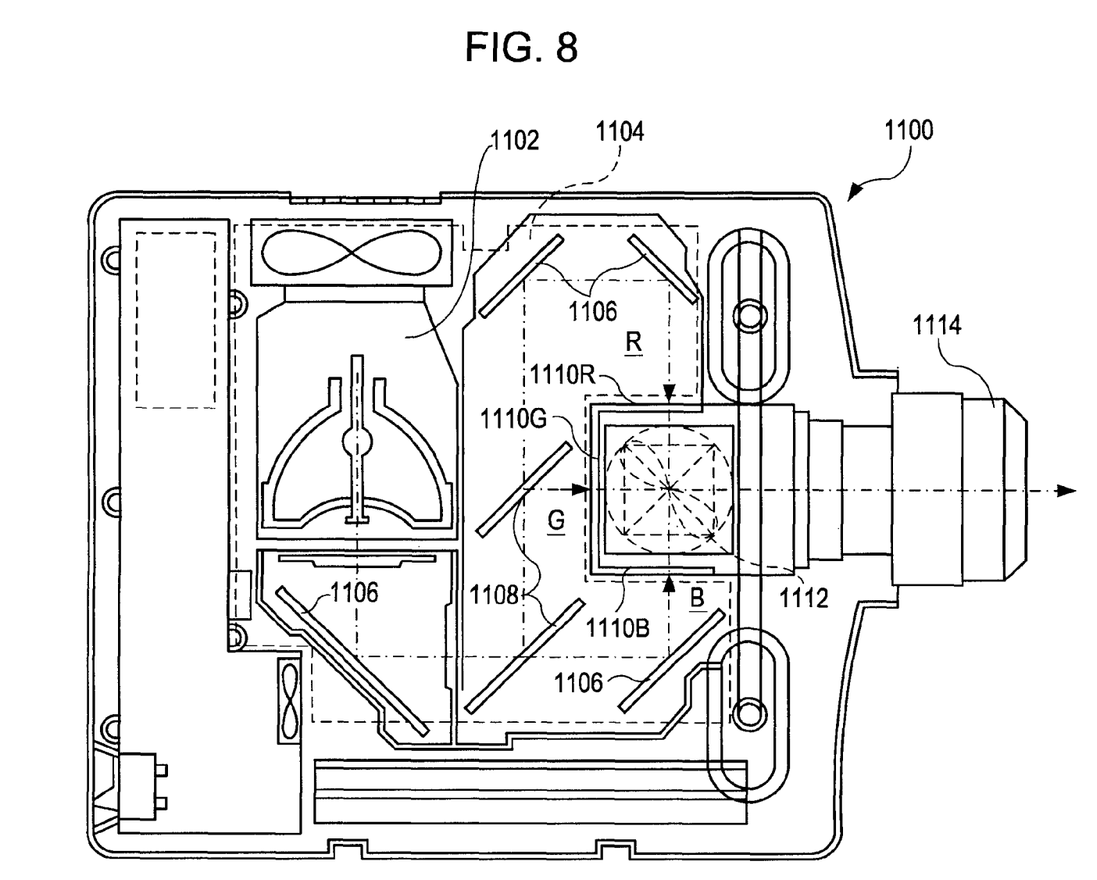
FIG. 8 is a plan view illustrating the configuration of a projector serving as an example of an electronic apparatus in which an electro-optical device has been applied.

Next, a case in which the aforementioned liquid crystal device has been applied in a projector serving as an example of an electronic apparatus will be described with reference to FIG. 8. The aforementioned liquid crystal device 100 is used as the light bulb of the projector. FIG. 8 is a plan view illustrating an example of the configuration of the projector.

As shown in FIG. 8, a lamp unit 1102 configured of a white light source such as a halogen lamp is provided in a projector 1100. Projection light emitted from the lamp unit 1102 is split into the three primary RGB colors by four mirrors 1106 and two dichroic mirrors 1108 disposed within a light guide 1104, and then enters into liquid crystal panels 1110R, 1110B, and 1110G serving as light bulbs corresponding to the respective primary colors.

The configurations of the liquid crystal panels 1110R, 1110G, and 1110B are the same as the configuration of the aforementioned liquid crystal device 100, and the liquid crystal panels 1110R, 1110G, and 1110B are respectively driven by R, G, and B primary color signals supplied from an image signal processing circuit. The light that has been modulated by these liquid crystal panels enters into a dichroic prism 1112 from three directions. This dichroic prism 1112 refracts the R and B light by 90 degrees, whereas the G light proceeds directly. Accordingly, the result of synthesizing images of the three colors is projected as a color image onto a screen or the like through a projection lens 1114.

Here, focusing on the display images of the respective liquid crystal panels 1110R, 1110B, and 1110G, it is necessary to invert right and left of the display images of the liquid crystal panels 1110R and 1110B relative to the display image of the liquid crystal panel 1110G.

Note that because light corresponding to the respective primary colors of R, G, and B enters into the liquid crystal panels 1110R, 1110G, and 1110B due to the dichroic mirrors 1108, it is not necessary to provide a color filter.

Note that the following can also be given as examples of the electronic apparatus described with reference to FIG. 8: mobile computers, mobile telephones, liquid crystal televisions, video recorders having viewfinders or monitor displays, car navigation apparatuses, pagers, PDAs, calculators, word processors, workstations, videophones, POS terminals, apparatuses including touch panels, and so on. It goes without saying that the invention can be applied in such various types of electronic apparatuses as well.

The invention is not intended to be limited to the aforementioned embodiments, and many variations can be made thereon without departing from the essential spirit of the invention as set forth in the appended claims and the specification as a whole; electro-optical device substrates, electro-optical devices, and electronic apparatuses derived from such modifications also fall within the technical scope of the invention.

The entire disclosure of Japanese Patent Application No. 2010-006993, filed Jan. 15, 2010 is expressly incorporated by reference herein.

What is claimed is:

1. An electro-optical device substrate, comprising, upon a substrate:
   multiple pixel units;
   multiple first electrodes, provided in a peripheral region located in the periphery of a pixel region in which the multiple pixel units are arranged, that are configured containing a first conductive material;
   multiple second electrodes, provided in the peripheral region, that are configured containing a second conductive material that differs from the first conductive material;
   multiple first lines that are formed in the peripheral region, are configured containing the first conductive material, and electrically connect first electrodes that are adjacent to each other of the multiple first electrodes; and
   a second line that is formed in the peripheral region and that electrically connects at least one of the multiple first electrodes and at least one of the multiple second electrodes,
   wherein the electrical resistance of the second line is higher than the electrical resistance of the multiple first lines.

2. The electro-optical device substrate according to claim 1,
   wherein the substrate has a layered structure containing multiple conductive layers;
   the multiple first electrodes, the multiple second electrodes, and the multiple first lines configure at least part of one of the multiple conductive layers; and
   the second line configures at least part of another of the multiple conductive layers.

3. The electro-optical device substrate according to claim 1,
   wherein when the substrate is viewed from above, the width of the second line is narrower than the width of the multiple first lines.

4. The electro-optical device substrate according to claim 1,
   wherein the length of the second line is longer than the distance between adjacent second electrodes of the multiple second electrodes.

5. The electro-optical device substrate according to claim 1,
   wherein the second line is configured containing a conductive material having a higher electrical resistivity than the electrical resistivity of the first conductive material.

6. An electro-optical device comprising the electro-optical device substrate according to claim 1.

7. An electro-optical device comprising the electro-optical device substrate according to claim 2.

8. An electro-optical device comprising the electro-optical device substrate according to claim 3.

9. An electro-optical device comprising the electro-optical device substrate according to claim 4.

10. An electro-optical device comprising the electro-optical device substrate according to claim 5.

11. An electronic apparatus comprising the electro-optical device according to claim 6.

* * * * *